United States Patent

Amo

[11] Patent Number: 5,888,433
[45] Date of Patent: Mar. 30, 1999

[54] METHOD OF CORRECTING NONALIGNMENT OF A STORAGE DISC

[75] Inventor: Mikuni Amo, Tokushima, Japan

[73] Assignee: Kitano Engineering Co., Ltd., Komatsushima, Japan

[21] Appl. No.: 902,716

[22] Filed: Jul. 30, 1997

[30] Foreign Application Priority Data

Jul. 31, 1996 [JP] Japan .................................. 8-219467

[51] Int. Cl.$^6$ .................................................. B29D 11/00
[52] U.S. Cl. ........................ 264/1.33; 264/1.38; 425/810
[58] Field of Search ................................ 264/1.33, 1.38, 264/106, 107; 425/810; 156/74

[56] References Cited

U.S. PATENT DOCUMENTS

| | | | |
|---|---|---|---|
| 4,704,181 | 11/1987 | Kubo | 156/423 |
| 4,877,475 | 10/1989 | Uchida et al. | |
| 5,069,155 | 12/1991 | Kunze-Concewitz et al. | |
| 5,197,060 | 3/1993 | Yatake | |
| 5,273,598 | 12/1993 | Higasihara et al. | 264/1.33 |
| 5,744,193 | 4/1998 | Kitano | 156/74 |

Primary Examiner—Mathieu D. Vargot
Attorney, Agent, or Firm—Flynn, Thiel, Boutell & Tanis, P.C.

[57] ABSTRACT

In a technique for bonding two disc-shaped resin substrates constituting the storage disc, the disc-shaped resin substrates are centered to correct the nonalignment therebetween. The method includes steps of placing disc-shaped resin substrates, which have central holes and adhesive interposed therebetween, on a centering holding table provided with a boss, spreading the boss inserted into the central holes of the disc-shaped resin substrates outwardly to center the disc-shaped resin substrates, and partially irradiating the adhesive interposed between the disc-shaped resin substrates with UV rays for curing the disc-shaped resin substrates in the vicinity of the centers thereof to temporarily fix the disc-shaped resin substrates. The nonalignment between the disc-shaped resin substrates is corrected, thereby increasing the quality of the storage disc. Further, the boss inserted into the central hole of the storage disc is used to center the disc-shaped resin substrates, which prevents the apparatus from being complex and expensive to manufacture.

13 Claims, 10 Drawing Sheets

METHOD OF CORRECTING NONALIGNMENT OF A STORAGE DISC

BACKGROUND OF THE INVENTION

1. Field of the Invention

The present invention relates to a storage disc, particularly to a method of correcting nonalignment between disc-shaped resin substrates each constituting a storage disc.

2. Prior Art

Computers, especially personal computers, have become remarkably popular recently, and the capacity of the storage medium to be used thereby, particularly the capacity of a storage disc and the kinds of storage media have increased. In addition, the application of storage discs to various fields has also increased. Accordingly, in a CD mainly for use in music, there is a tendency to develop the storage disc as a video disc.

The storage disc may be in the form of a magnetic disc, an optical disc (e.g., CD-ROM), an optical magnetic disc (e.g., MO), etc. The demand for optical discs as storage, discs has increased recently.

Exemplifying an optical disc called a DVD, a disc-shaped resin substrate that is a single plate constituting the DVD is required to have a thickness of 0.6 mm, an outer diameter of 120 mm, and a central hole inner diameter of 15 mm. If such a disc-shaped resin substrate is formed of a single substrate, it is low in a mechanical strength and is easily deformable. Accordingly, two disc-shaped resin substrates each having the same thickness (0.6 mm) are bonded to each other to form an integrated substrate.

For example, FIGS. 11(A) and (B) schematically generally show a DVD serving as an optical disc which DVD is formed of two disc-shaped resin substrates (a first disc-shaped resin substrate D1 and a second disc-shaped resin substrate D2) which are bonded to each other.

An Information signal is applied to one disc-shaped resin substrate D1, namely information is stored in one disc-shaped resin substrate as shown in FIG. 11(A), while information is stored in both disc-shaped substrates D1 and D2 as shown in FIG. 11(B).

An optical disc D formed by bonding two disc-shaped resin substrates D1 and D2 receives light reflected from the reflection film D11 using a laser beam by a light detector, not shown, to thereby reproduce signals.

Since the high density storage disc including the DVD does not include a single substrate or plate, but frequently includes plural substrates or plates, the first disc-shaped resin substrate D1 and the second disc-shaped resin substrate D2 must be bonded to each other.

The following series of steps are performed to form an integrated storage disc (i.e., an optical disc) by bonding each single plate (see FIG. 12).

Step 1: placing the first disc-shaped resin substrate D1 on a rotary holding table C;

Step 2: coating an adhesive R onto the first disc-shaped resin substrate D1;

Step 3: placing the second disc-shaped resin substrate D2 on the first disc-shaped resin substrate D1;

Step 4: developing the adhesive R interposed between the first and second disc-shaped resin substrates D1 and D2; and Step 5: curing the thus developed adhesive R.

These steps are explained in more detail herebelow.

In Step 1, the first disc-shaped resin substrate D1 having thereon an information storage surface coated with a reflection film and a protection film is uniformly drawn by and held on the rotary holding table C.

In Step 2, the adhesive R, e.g., UV curing resin is slowly discharged from a discharge nozzle N while the rotary holding table C on which the first disc-shaped resin substrate D1 is placed is rotated at low speed (several ten rpm). The adhesive R has a different track on the first disc-shaped resin substrate D1 depending on a manner in which it is discharged from the discharge nozzle N, but it is preferable to have a doughnut-shaped track as shown in FIGS. 11(A) and 11(B).

In Step 3, a transparent second disc-shaped resin substrate D2 is placed on the first disc-shaped resin substrate D1 which is coated with the adhesive R. The substrate D2 may be in the form of a transparent substrate on which no information signal is applied, or the substrate D2 may be in the form of a substrate on which an information signal is applied.

In Step 4, the adhesive R interposed between the first and second disc-shaped resin substrates D1 and D2 is developed to extend uniformly between the first and second disc-shaped resin substrates D1 and D2.

This development of the adhesive R is performed by rotating the rotary holding table C at high speed (normally, several thousands rpm or more for about several seconds) in a state where the storage disc D, namely, the integrated disc-shaped resin substrate formed by bonding the first and second disc-shaped resin substrates D1 and D2, is placed on the rotary holding table C.

When the rotary holding table C is rotated at high speed, surplus adhesive R which is present between the bonded first and second disc-shaped resin substrates D1 and D2 is scattered outside while it is developed, and air (air bubble, etc.) confined between the first and second disc-shaped resin substrates D1 and D2 is discharged outside so that the adhesive R can be uniformly developed between the first and second disc-shaped resin substrates D1 and D2. During the development of the adhesive R, the adhesive R is drawn in the direction of the center through the boss of the rotary holding table which is inserted into the central hole of the storage disc.

In Step 5, the optical disc is irradiated with UV rays, namely, after the first and second disc-shaped resin substrates D1 and D2 are irradiated with UV rays in a state where the optical disc is slowly rotated (e.g. at about several rpm which is much slower than the rpm in the developing state set forth above) or not rotated so that the adhesive R, e.g., a UV curing resin layer is cured.

More specifically, the adhesive R is irradiated with UV light source UL provided with a reflection mirror at the back side thereof, thereby effectively curing the adhesive.

Further, the curing step is differs due to the kind of the adhesive R to be used, and hence it should be understood that a curing method conforming to the characteristic of the adhesive to be used is employed. In such a manner, the bonding step is completed.

In disc-shaped resin substrates of the type used to store information, such as substrates D1 and D2, there are two methods used to obtain information from the storage disc. The first method includes reading the information or signal by applying light from one direction (a method of reading information from a storage disc of a type having a standard used by a dual layer DVD), and the second method includes reading information by applying light from both directions (a method of reading information from a storage disc used by a single layer or double-sided DVD). In the first method, if there is a misalignment between the disc-shaped resin substrates D1 and D2, information contained in the disc-shaped resin substrates D1 and D2 cannot be correctly read if the central holes of the substrates are not concentrically positioned.

FIG. 10 shows a state where the nonalignment occurs between the disc-shaped resin substrates D1 and D2 and wherein slippage of information stored in the disc-shaped resin substrates D1 and D2 also occurs. If the disc-shaped resin substrates D1 and D2 are bonded with each other in this state, the information cannot be correctly read from one direction.

Meanwhile, in a standard of dual layer DVD, it is preferable that the nonalignment between the disc-shaped resin substrates D1 and D2 does not exceed 15 µm to prevent the DVD from becoming a defective product. The nonalignment has already occurred in a state where the disc-shaped resin substrate D2 is placed on the disc-shaped resin substrate D1.

In the next developing step, the adhesive is developed on the rotary holding table on which the disc-shaped resin substrates D1 and D2 are placed while there occurs the nonalignment or misalignment therebetween.

In the developing step, the boss 1 on the rotary holding table is inserted into the central holes of the disc-shaped resin substrates D1 and D2 to temporarily position the disc-shaped resin substrates D1 and D2. Since there is a slight difference between the outer diameter of the boss 1 and the diameters of the central holes of the disc-shaped resin substrates D1 and D2, a minute nonalignment between the disc-shaped resin substrates D1 and D2 cannot be corrected even when they are positioned by the boss 1.

Accordingly, the nonalignment between the disc-shaped resin substrates D1 and D2 is not corrected but remains as it is, even if the developing step of the adhesive is completed.

Although the adhesive is cured on the entire surfaces on the disc-shaped resin substrates D1 and D2 in the curing step upon completion of the developing step, the nonalignment remains as it is, namely, it is fixed when the adhesive is cured, which permits the nonalignment to remain on the final product.

Under the circumstances, it is necessary that the nonalignment between the disc-shaped resin substrates D1 and D2 must be removed or corrected to the utmost before the curing step occurs.

SUMMARY OF THE INVENTION

The present invention has been made to solve the above problems. That is, it is an object of the invention to provide a method of correcting nonalignment or misalignment between two disc-shaped resin substrates of a storage disc in a technique for bonding two disc-shaped resin substrates by correcting the centers thereof before an adhesive developed between two substrates is cured.

It is another object of the present invention to provide a method of maintaining the corrected nonalignment between the disc-shaped resin substrates.

The inventor of this application has researched the above mentioned problems, and has found that the nonalignment between the disc-shaped resin substrates can be corrected if a pressing force is applied radially to the inner ends of the central holes of the disc-shaped resin substrates before the curing step. Based on this finding, the present invention has been completed.

To achieve the above object, a method of correcting nonalignment of a storage disc according to a first aspect of the invention comprises the steps of placing disc-shaped resin substrates, which have central holes and together form the storage disc and include an adhesive therebetween, on a centering holding table provided with a boss, and spreading the boss outward for centering the disc-shaped resin substrates.

A method of correcting nonalignment of a storage disc according to a second aspect of the invention comprises steps of placing disc-shaped resin substrates, which have central holes and together form the storage disc and include an adhesive therebetween, on a centering holding table provided with a boss, spreading the boss inserted into central holes of the disc-shaped resin substrates outwardly to center the disc-shaped resin substrates, and partially irradiating an adhesive interposed between the disc-shaped resin substrates with UV rays for curing the disc-shaped resin substrates in the vicinity of the centers thereof to temporarily fix the disc-shaped resin substrates.

A method of correcting nonalignment of a storage disc according to a third aspect of the invention comprises steps of placing disc-shaped resin substrates, which have central holes and together form the storage disc and include an adhesive therebetween, on a centering holding table provided with a boss, spreading the boss inserted into central holes of the disc-shaped resin substrates outwardly to center the disc-shaped resin substrates, drawing the adhesive in the directions of the central holes of the disc-shaped resin substrates through the boss, and partially irradiating an adhesive interposed between the disc-shaped resin substrates with UV rays for curing the disc-shaped resin substrates in the vicinity of the centers thereof to temporarily fix the disc-shaped resin substrates.

Other aspects of the invention will be understood from the description and claims set forth hereunder together with the attached drawings.

When a method of developing the adhesive set forth above is employed, an external force is applied to an inner end of the central holes of the disc-shaped resin substrates so as to surely correct the nonalignment therebetween. Further, when the disc-shaped resin substrates are temporarily fixed, the nonalignment is corrected thereafter so that the concentrically arranged state between the disc-shaped resin substrates is maintained.

BRIEF DESCRIPTION OF THE DRAWINGS

FIGS. 1(A) and 1(B) show a centering holding table wherein FIG. 1(A) is a plan view and FIG. 1(B) is a side view a part of which is a cross sectional view;

FIGS. 2(A) and 2(B) are perspective views of a boss wherein FIG. 2(A) shows a contracted state of the boss, FIG. 2(B) is an enlarged state thereof;

FIGS. 4(A) and 4(B) are views explaining a principle of correction of nonalignment between the disc-shaped resin substrates by the boss wherein FIG. 4(A) shows a close state of the boss and FIG. 4(B) shows a relation between the disc-shaped resin substrate and the boss;

FIGS. 5(A) and 5(B) are views explaining a principle of correction of nonalignment by the boss wherein FIG. 5(A) shows an opened or enlarged state of the boss and FIG. 5(B) shows a relation between the disc-shaped resin substrate and the boss;

FIGS. 8(A) and 8(B) are views showing a suction or drawing operation wherein FIG. 8(A) shows a state where development is not completed and FIG. 8(B) shows a state where development is completed;

FIGS. 9(A) and 9(B) are views showing another drawing operation wherein FIG. 9(A) shows a state where development is not completed and FIG. 9(B) shows a state where development is completed;

FIGS. 10(A) and 10(B) are views each showing the state where two disc-shaped resin substrates are out of alignment, wherein FIG. 10(A) is a plan view and FIG. 10(B) is a cross sectional view;

PREFERRED EMBODIMENT OF THE INVENTION

It is a key point in a method of correcting nonalignment between disc-shaped resin substrates that inner ends of central holes DH of the disc-shaped resin substrates are pressed or spread outward by a boss. Accordingly, a centering holding table for pressing the inner ends of the central holes DH outward will be described.

Figure 1:
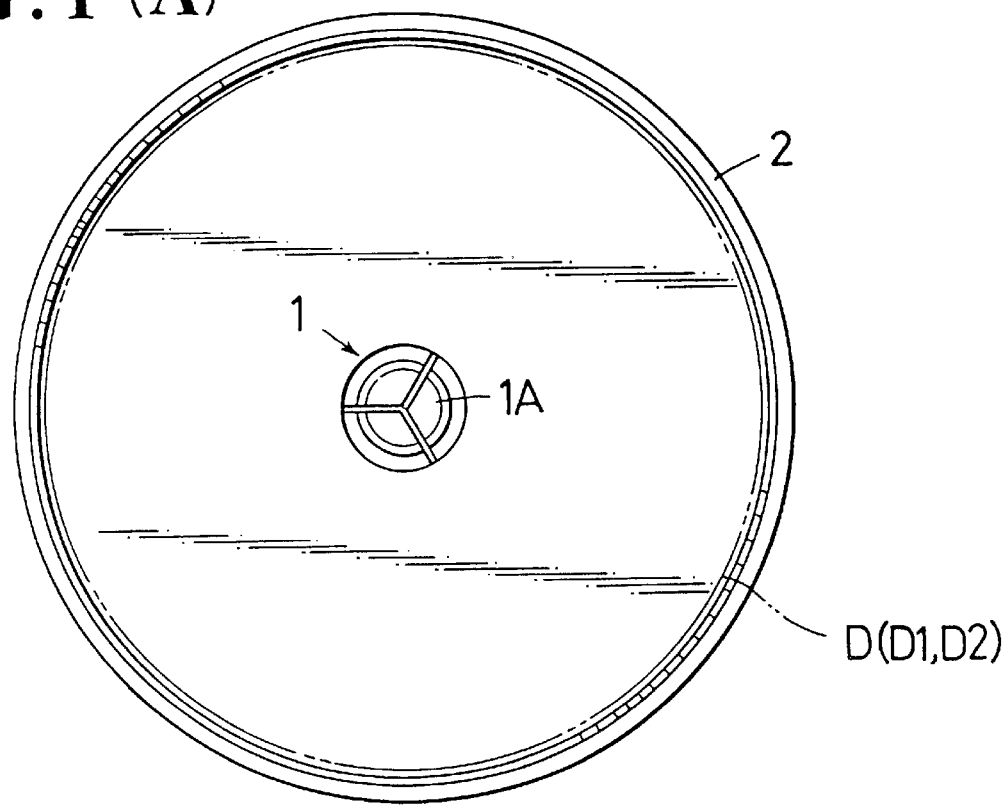
Figure 1:
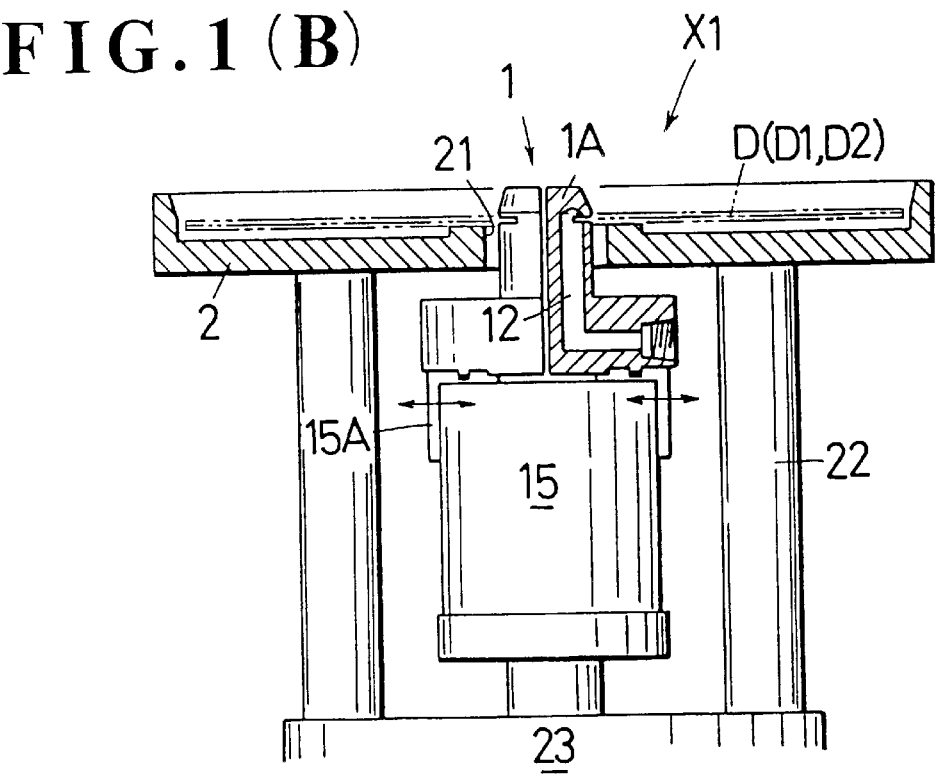

FIG. 1(A) and 1(B) show a centering holding table wherein FIG. 1(A) is a plan view and FIG. 1(B) is a side view a part of which is a cross sectional view.

The centering holding table X1 comprises a disc-shaped receiver 2 supported by struts 22, and a boss 1 which is inserted and disposed in a central hole 21 defined in the center of the receiver 2. A thick part is provided at the periphery of the central hole 21 and the central portions of the disc-shaped resin substrates D1 and D2 are supported by this thick part.

The struts 22 for supporting the receiver 2 are fitted to a base 23. The boss 1 which is inserted and arranged in the central hole 21 of the receiver 2 is inserted into the central hole DH of the optical disc when the disc-shaped resin substrate D (disc-shaped resin substrates D1 and D2) is placed on the receiver 2. The boss 1 can be enlarged radially by a cylinder chuck 15.

Figure 2:
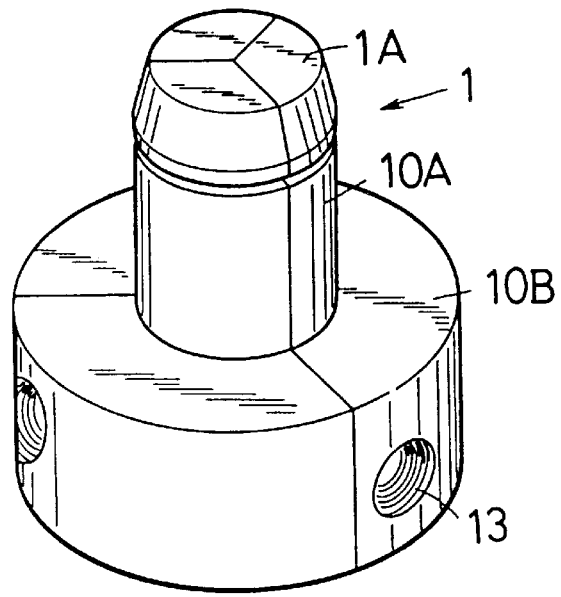
Figure 2:
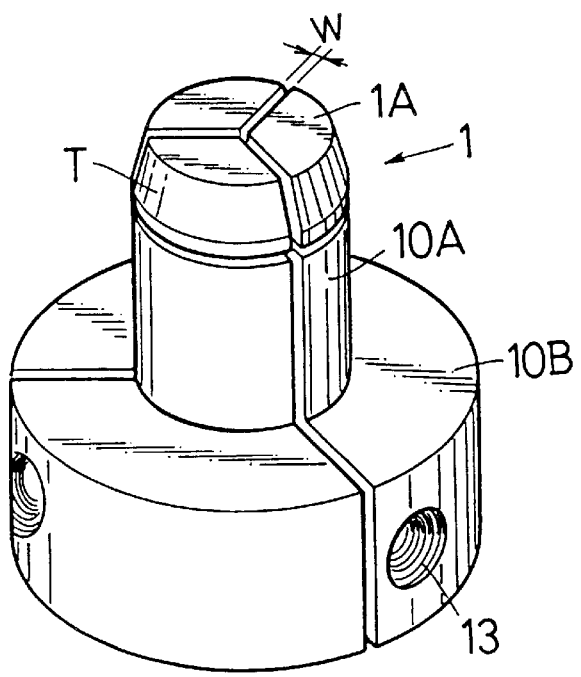

FIGS. 2(A) and 2(B) are perspective views of a boss wherein FIG. 2(A) shows a contracted state of the boss and FIG. 2(B) is an enlarged state.

The boss 1 comprises three L-shaped blocks 1A. When each block 1A is moved radially outward, the entire boss 1 is enlarged radially from the state shown in FIG. 2(A) to the state shown in FIG. 2(B).

Figure 3:
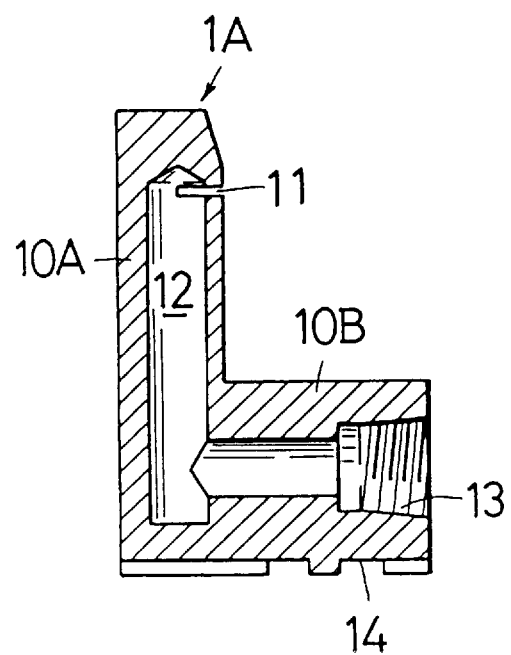
FIG. 3 is an enlarged view of a block constituting the boss in FIGS. 2(A) and 2(B)

FIG. 3 is an enlarged view of the block 1A of the boss 1. The block 1A comprises a vertical part 10A and a horizontal part 10B which are integrated with each other and form an L-shape.

A suction passage 12 is formed in the vertical and horizontal parts 10A and 10B, and a slit-shaped suction or drawing groove 11 is defined at the periphery of the part 10A by cutting shallow into the surface of the vertical part 10A.

An end 13 of the suction passage 12 provided in the horizontal part 10B is connected with a pipe, not shown, and communicates with a controllable negative pressure source. The drawing groove 11 is provided for sucking or drawing an adhesive R between the disc-shaped resin substrates D1 and D2 by the boss 1 so that the adhesive R can be sufficiently developed in the central direction. The width of the drawing groove 11 is about 0.5 mm.

The vertical parts 10A of each block 1A are arranged at an angle of 120 degrees as shown from above, and one boss 1 is assembled by combining three blocks or boss sections 1A. In the boss 1, a horizontal bottom surface 14 of the block 1A is fixed to a movement jaw 15A of the cylinder chuck 15. The movement jaw 15A is movable radially by a piston incorporated into the cylinder chuck 15, which piston is not shown.

Since the cylinder chuck 15 has three movement jaws 15A, the blocks 1A are movable radially together along with the movement of the movement jaws 15A. Accordingly, the boss 1 can be enlarged radially as a whole.

Each of intervals W between blocks 1A is freely changed by the cylinder chuck 15 from a state where the blocks 1A are closed to a state where the blocks 1A are opened or vice versa. The cylinder chuck 15 is a known type. When the boss 1 is design to have a contracted state and an enlarged state, it is possible to center the disc-shaped resin substrates D1 and D2 for correcting the nonalignment between the disc-shaped resin substrates D1 and D2.

In the contracted state, the diameter of the boss 1 is set to be slightly narrower or less than each diameter of the central holes DH of the disc-shaped resin substrates D1 and D2 (e.g., about 0.5 mm). In the enlarged state, the diameter of the boss 1 is set to be substantially the same as each diameter of the central holes DH of the disc-shaped resin substrates D1 and D2 (e.g., about 15 mm). The boss 1 may have an inclined surface T at the upper portion thereof so that it can be easily inserted into the central hole DH. The use of the centering holding table having such a structure makes it possible to center the central holes DH of the disc-shaped resin substrates D1 and D2, thereby correcting the nonalignment therebetween.

The method of correcting the nonalignment between the disc-shaped resin substrates D1 and D2 is preferably carried out using the centering holding table X1 set forth above.

The method will now be described more in detail as follows.

Figure 4:
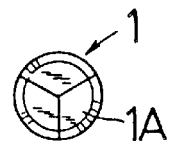
Figure 4:
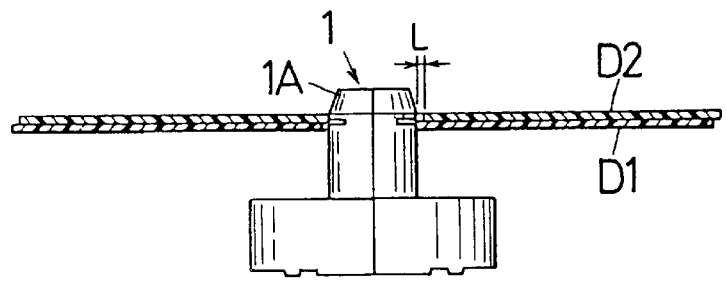
Figure 5:
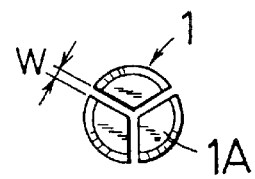
Figure 5:
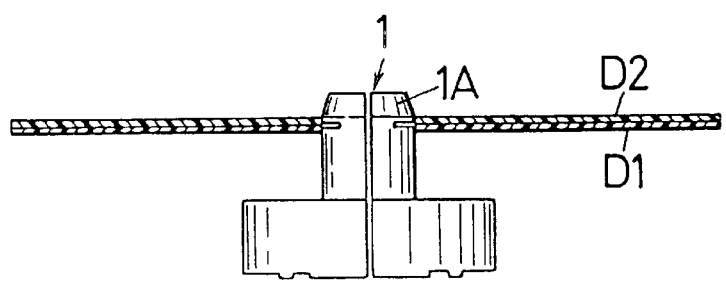
Figure 6:
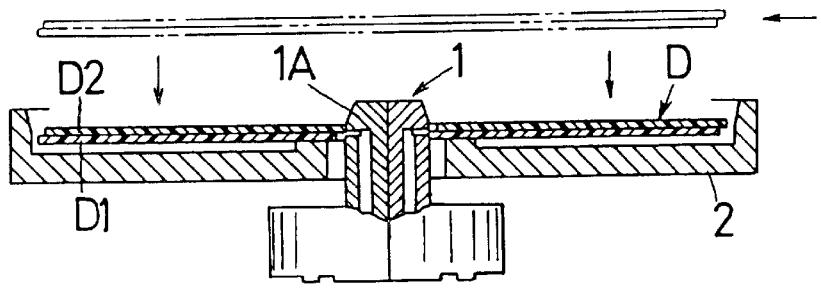
FIGS. 6(A) to 6(D) are views showing steps of correcting nonalignment.
Figure 6:
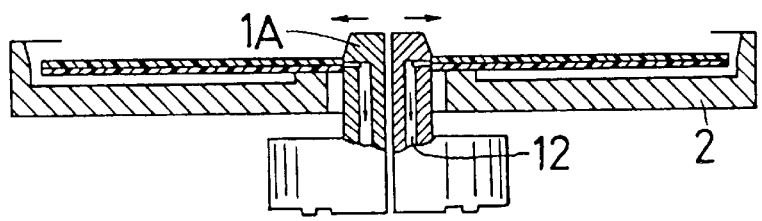
Figure 6:
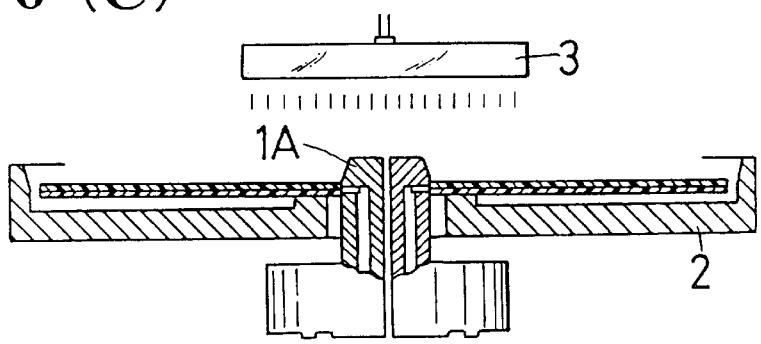
Figure 6:
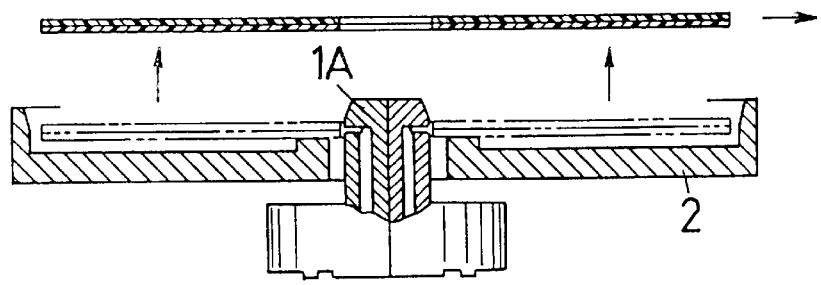

FIGS. 4(A) and 4(B) and FIGS. 5(A) and 5(B) are views explaining a principle of correction of nonalignment by the boss wherein FIG. 4(A) shows a closed or contracted state and FIG. 5(A) shows an enlarged state of the boss and FIG. 4(B) and FIG. 5(B) show a relation between the disc-shaped resin substrate and the boss.

FIGS. 4(A) and 4(B) show a state where there is misalignment by amount L between the disc-shaped resin substrates D1 and D2.

The boss 1 is enlarged radially as a whole when each of the blocks 1A is moved radially outward so as to press the inner ends of the central holes DH of the disc-shaped resin substrates D1 and D2. Accordingly, the disc-shaped resin substrates D1 and D2 are centered by the pressing force.

Meanwhile, FIGS. 5(A) and 5(B) show a state where the disc-shaped resin substrates D1 and D2 were centered and the nonalignment therebetween was corrected. It is understood from these views that the nonalignment between the disc-shaped resin substrates D1 and D2 was corrected by the boss 1.

In a state where the disc-shaped resin substrates D1 and D2 are concentrically arranged with each other while the nonalignment therebetween is corrected, they are irradiated partially with UV rays in the vicinity of the center thereof and temporarily fixed.

Figure 7:
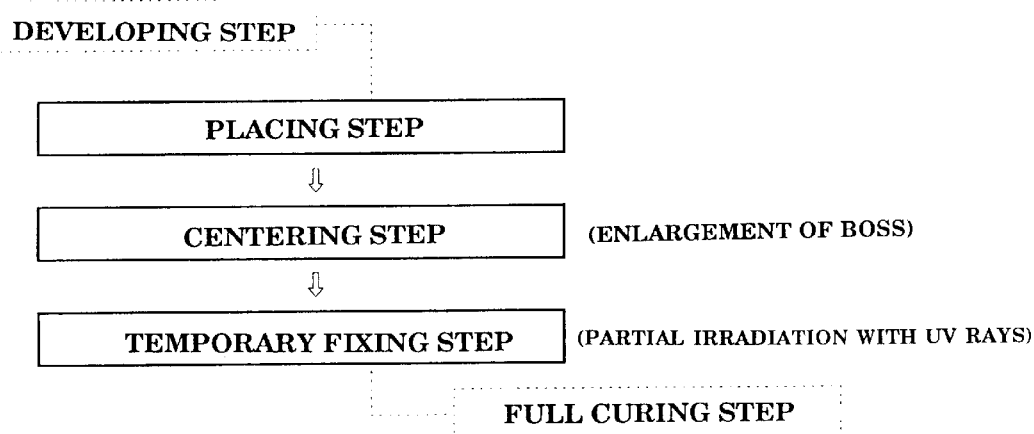
FIGS. 7(A) and 7(B) are block diagrams showing steps of correcting nonalignment.
Figure 7:
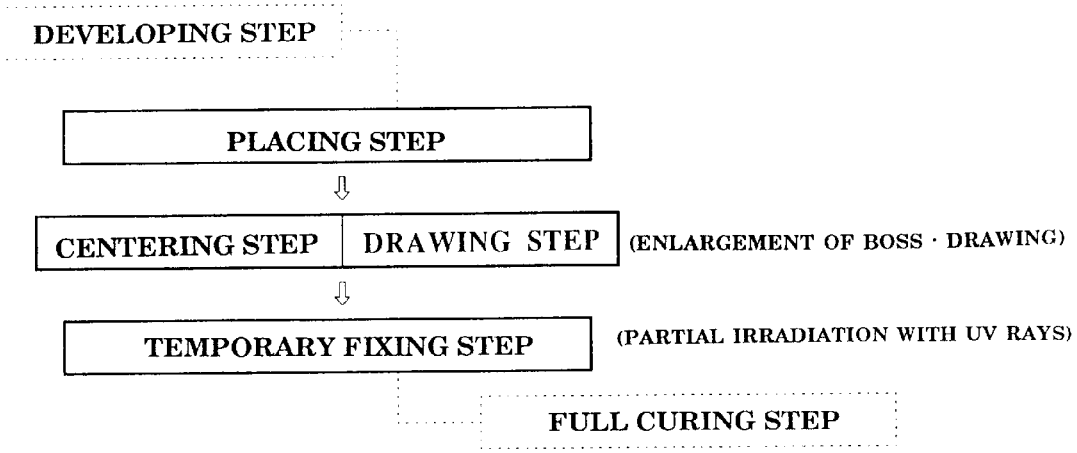

FIGS. 6(A) to 6(D) are views showing steps of correcting nonalignment, and FIGS. 7(A) and 7(B) are block diagrams showing steps of correcting nonalignment in a different manner.

The adhesive interposed between the disc-shaped resin substrates D1 and D2 has already been developed in the previous step.

In a placing step, an optical disc (two disc-shaped resin substrates) which was subjected to the developing step is positioned over the centering holding table X1, and it is lowered onto the centering holding table X1 as it is (see FIG. 6(A)).

At the time when two disc-shaped resin substrates D1 and D2 are placed on the centering holding table X1, the boss 1 is inserted and arranged in the central holes DH of the disc-shaped resin substrates D1 and D2 so that the disc-shaped resin substrates D1 and D2 are substantially centered or positioned on table X1.

Next, when the cylinder chuck 15 operates, the movement jaws 15A move outward in the radial direction, and at the same time the blocks 1A of the boss 1 move outward in the radial direction (see FIG. 6(B)). As a result, the boss 1 is enlarged, namely, spread out as a whole.

At this time, the boss 1 strongly presses the inner ends of the central hole DH of two disc-shaped resin substrates D1 and D2 at the peripheral surface thereof. The centers of the disc-shaped resin substrates D1 and D2 that are out of alignment so far are centered, i.e. positioned concentrically with each other by the pressing force generated at this time. By this centering, the mutual nonalignment between the disc-shaped resin substrates D1 and D2 is corrected.

In the centering step, it is preferable that the accurate suction or drawing is performed through the drawing groove 11 of the boss 1. In this case the drawing is quickly performed at the same time when the centering is performed or after the centering is completed (see FIG. 7(A)).

This drawing is performed after the optical disc is placed on the centering holding table X1 and before the storage disc is irradiated with UV rays in the next temporary fixing step.

Figure 8:
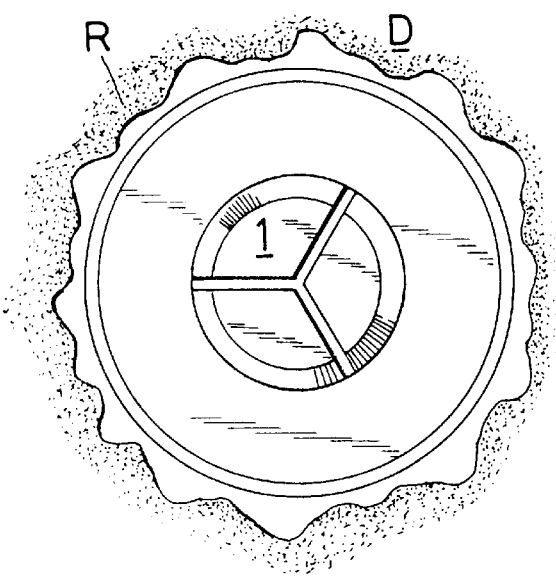
Figure 8:
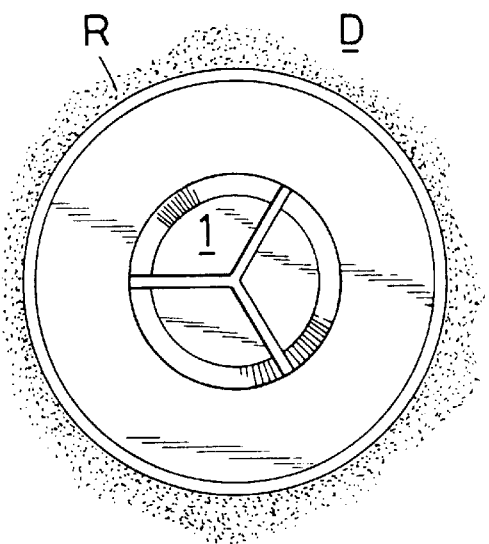

FIGS. 8(A) and 8(B) are views showing a drawing operation of the adhesive R wherein FIG. 8(A) shows a state where the development to extend to a liquid stop groove is not completed and FIG. 8(B) shows a state where the development is completed.

Figure 9:
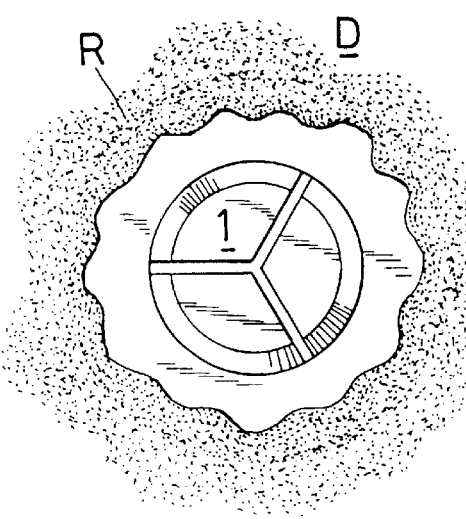
Figure 9:
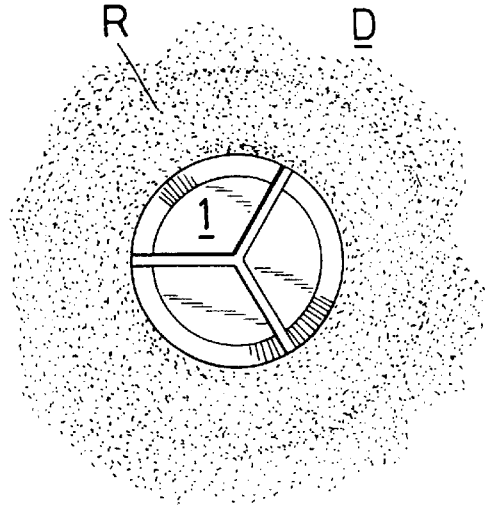
Figure 10A:
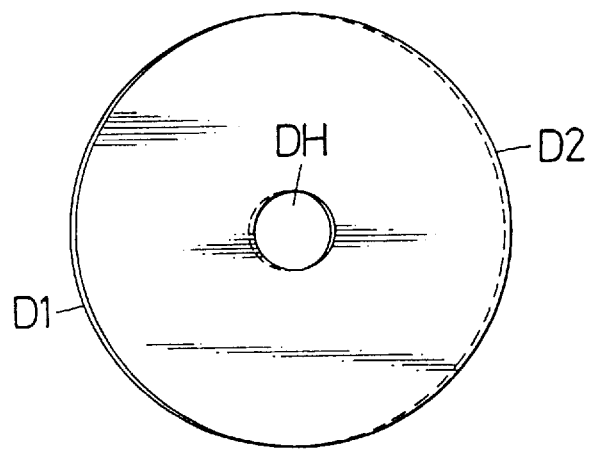
Figure 10B:
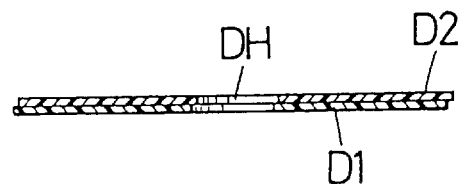
Figure 11:
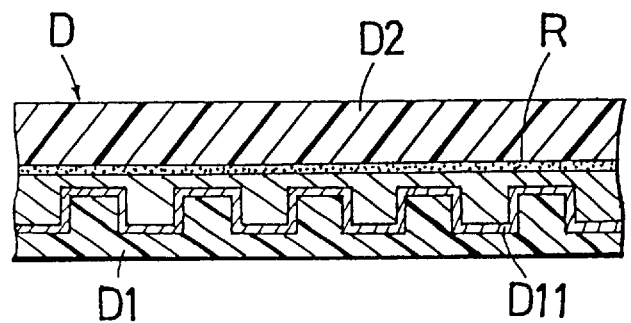
FIGS. 11(A) and 11(B) are schematic cross sectional views showing a storage disc (for example, a DVD as an optical disc)
Figure 11:
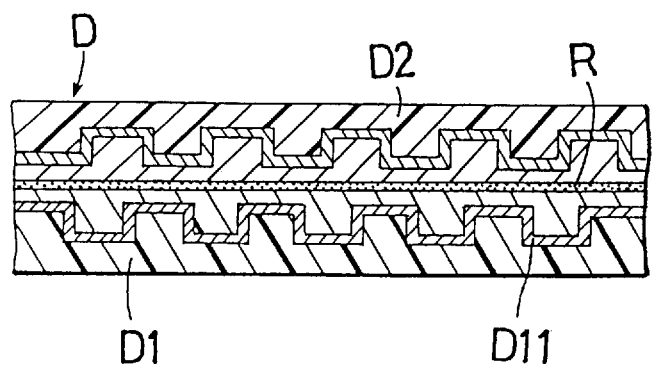
Figure 12:
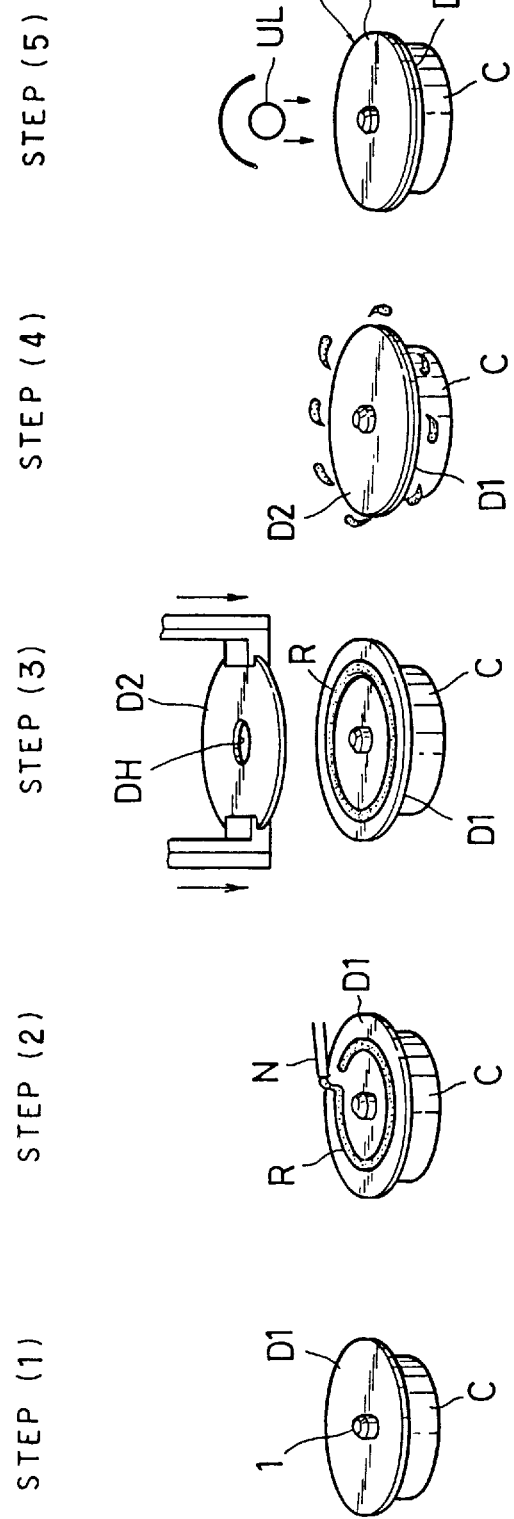
FIG. 12 is a schematic view showing a bonding step of the disc-shaped resin substrates.

FIGS. 9(A) and 9(B) are views showing a drawing operation wherein FIG. 9(A) shows a state where the development to extend to the inner ends of the central holes DH of the storage disc is not completed and FIG. 9(B) shows a state where the development is completed. The development is completed to agree with a standard as shown in FIGS. 8(A) and 8(B) and FIGS. 9(A) and 9(B) since the standard of the developing state differs depending on the kind of optical disc. The drawing groove 11 has a width which is smaller than the thickness of each of the disc-shaped resin substrates D1 and D2, and when it is positioned relative to the adhesive between the disc-shaped resin substrates D1 and D2, the drawing of the adhesive can be accurately performed. When the adhesive is drawn, the development thereof, even if it is insufficient in the previous developing step, can be sufficiently completed.

Then, the disc-shaped resin substrates D1 and D2 are irradiated with UV rays in the vicinity of the central holes DH of the disc-shaped resin substrates D1 and D2 in a temporary fixing step, so that they are temporarily fixed (FIG. 6(C)).

The optical disc is partially irradiated with UV rays. In detail, the disc-shaped resin substrates D1 and D2 are irradiated with UV rays in the vicinity of the centers thereof by a UV irradiation device 3 such as a metal halide lamp which is moved directly over the centering holding table X1.

The storage disc is irradiated with UV rays at a region which is slightly wider than a position where a liquid sealed groove is defined. Since the disc-shaped resin substrate is transparent at the position slightly outside the liquid sealed groove or inside the liquid sealed groove, the UV rays can easily pass through the disc-shaped resin substrate, thereby curing the adhesive.

Accordingly, the adhesive interposed between disc-shaped resin substrates D1 and D2 in the vicinity of the centers thereof is cured to fix the disc-shaped resin substrates D1 and D2 temporarily and partially. In detail, in the case of FIG. 8(B), the portion several mm outside the liquid sealed groove is cured and temporarily fixed. In the case of FIG. 9(B), the portion several mm inside the liquid sealed groove is cured and temporarily fixed. After the temporary fixation of the disc-shaped resin substrates D1 and D2, they are removed from the centering holding table X1, and then they are subjected to a full curing step by the next irradiation of two disc-shaped resin substrates with the UV rays (see FIG. 6 (D)).

The removal of the disc-shaped resin substrates D1 and D2 from the centering holding table X1 is performed by the cylinder chuck 15. Even if an excessive force is applied to the disc-shaped resin substrates D1 and D2 during the removal thereof, the disc-shaped resin substrates D1 and D2 do not misalign again because they are temporarily fixed. The disc-shaped resin substrates D1 and D2 are not out of alignment in the centers thereof after they are temporarily fixed, and hence they remain concentrically positioned, so that they can be easily handled.

Although the present invention has been described with reference to the preferred embodiment, it is not limited to this embodiment, and it can be variously modified without departing from the scope of the gist of the invention.

For example, although the boss 1 comprises three blocks 1A, the number of blocks 1A is not limited to three, but it may be any number if the disc-shaped resin substrates D1 and D2 can be centered. Although the cylinder chuck 15 is used to press or spread the blocks 1A outward, it may comprise another means having a function to move each block 1A of the boss 1 in a radial direction. Further, the storage disc of this invention can be applied sufficiently to other discs including an optical disc.

With the arrangement of the storage disc manufactured by the present method, the nonalignment between the disc-shaped resin substrates D1 and D2 is corrected, thereby increasing the quality of the storage disc. Further, the boss 1 inserted into the central hole DH of the storage disc is used to center the disc-shaped resin substrates D1 and D2, thereby preventing the apparatus from being complex and expensive to manufacture.

What is claimed is:

1. A method of correcting a misaligned storage disc including two disc-shaped resin substrates and an adhesive layer sandwiched therebetween, each disc-shaped resin substrate having an inner peripheral edge surface defining a centrally disposed circular hole, said method comprising the steps of:

placing the storage disc on a centering and holding table and inserting a radially expandible boss of the table into the central holes of the two disc-shaped resin substrates; and expanding the boss radially outwardly to press against the inner peripheral edge surfaces of the two disc-shaped resin substrates and concentrically aligning the two disc-shaped resin substrates with respect to one another.

2. The method of claim 1 further including drawing the adhesive interposed between the two disc-shaped resin substrates toward the central holes thereof by applying suction through a passage disposed in the boss.

3. The method of claim 1 wherein the boss includes a plurality of radially movable and separate boss sections configured and disposed to together provide the boss with a generally cylindrical shape having a diameter less than a diameter of each of the central holes of the two disc-shaped resin substrates, said step of expanding including simultaneously moving each of the boss sections radially outwardly and away from one another to press against portions of the inner peripheral edge surfaces of the two disc-shaped resin substrates.

4. A method of correcting a misaligned storage disc including two disc-shaped resin substrates and an adhesive layer sandwiched therebetween, each disc-shaped resin substrate having an inner peripheral edge surface defining a circular hole, said method comprising the steps of:

placing the storage disc on a centering and holding table and inserting a radially expandable boss of the table into the central holes of the two disc-shaped resin substrates;

expanding the boss radially outwardly to press against the inner peripheral edge surfaces of the two disc-shaped resin substrates and concentrically aligning the two disc-shaped resin substrates with respect to one another; and partially irradiating with UV rays the adhesive interposed between the two disc-shaped resin substrates adjacent the central holes thereof to cure the adhesive and temporarily fix the two disc-shaped resin substrates to one another in a concentrically aligned position.

5. The method of claim 4 further including drawing the adhesive interposed between the two disc-shaped resin substrates toward the central holes thereof by applying suction through a passage disposed in the boss.

6. The method of claim 5 wherein said step of drawing is performed during said step of expanding.

7. The method of claim 4 wherein the boss includes a plurality of radially movable and separate boss sections and said step of expanding includes simultaneously moving each of the boss sections radially outwardly to press against the inner peripheral edge surfaces of the two disc-shaped resin substrates.

8. The method of claim 4 wherein the boss includes a plurality of radially movable and separate boss sections configured and disposed to together provide the boss with a generally cylindrical shape having a diameter less than a diameter of each of the central holes of the two disc-shaped resin substrates, said step of expanding including simultaneously moving each of the boss sections radially outwardly and away from one another to press against portions of the inner peripheral edge surfaces of the two disc-shaped resin substrates.

9. The method of claim 4 wherein the steps thereof are performed subsequent to, and at a different location from, a step of uniformly coating the adhesive interposed between the two disc-shaped resin substrates.

10. The method of claim 4 further including irradiating the entire storage disc with UV rays to cure the adhesive interposed between the two disc-shaped resin substrates subsequent to said step of partially irradiating.

11. A method of correcting a misaligned storage disc including two disc-shaped resin substrates and an adhesive layer sandwiched therebetween, each disc-shaped resin substrate having an inner peripheral edge surface defining a centrally disposed circular hole, said method comprising the steps of:

placing the storage disc on a centering and holding table and inserting a radially expandible boss of the table into the central holes of the two disc-shaped resin substrates;

expanding the boss radially outwardly to press against the inner peripheral edge surfaces of the two disc-shaped resin substrates and concentrically aligning the two disc-shaped resin substrates with respect to one another;

drawing the adhesive interposed between the two disc-shaped resin substrates toward the central holes thereof and through the boss; and partially irradiating with UV rays the adhesive interposed between the two disc-shaped resin substrates adjacent the central holes thereof to cure the adhesive and temporarily fix the two disc-shaped resin substrates to one another in a concentrically aligned position.

12. The method of claim 11 wherein the boss includes a passage therein opening adjacent the inner peripheral edge surfaces of the two disc-shaped resin substrates, the passage being in communication with a source of suction, and said step of drawing includes drawing the adhesive interposed between the two disc-shaped resin substrates toward the central holes thereof and into the passage of the boss.

13. The method of claim 11 wherein the boss includes a plurality of radially movable and separate boss sections configured and disposed to together provide the boss with a generally cylindrical shape having a diameter less than a diameter of each of the central holes of the two disc-shaped resin substrates, said step of expanding including simultaneously moving each of the boss sections radially outwardly and away from one another to press against portions of the inner peripheral edge surfaces of the two disc-shaped resin substrates.

* * * * *